(12) United States Patent
Perry

(10) Patent No.: US 10,058,199 B1
(45) Date of Patent: Aug. 28, 2018

(54) FOOD TRAY ENCLOSURE

(71) Applicant: Kenneth Perry, Dorchester, MA (US)

(72) Inventor: Kenneth Perry, Dorchester, MA (US)

( * ) Notice: Subject to any disclaimer, the term of this patent is extended or adjusted under 35 U.S.C. 154(b) by 0 days.

(21) Appl. No.: 15/728,976

(22) Filed: Oct. 10, 2017

(51) Int. Cl.
*A47G 23/02* (2006.01)
*A47F 10/06* (2006.01)
*A47J 47/16* (2006.01)

(52) U.S. Cl.
CPC .............. *A47F 10/06* (2013.01); *A47J 47/16* (2013.01); *A47F 2010/065* (2013.01)

(58) Field of Classification Search
CPC ..... A47F 10/06; A47F 2010/065; A47J 47/16; A47J 47/14
USPC ........ 248/150, 176.2; 99/483, 449; 126/9 A, 126/9 R, 9 B, 42, 30; 220/556, 740, 574, 220/731, 730; 219/214; 312/140.4
See application file for complete search history.

(56) References Cited

U.S. PATENT DOCUMENTS

| | | | |
|---|---|---|---|
| 4,234,094 A * | 11/1980 | Jorgensen | A47J 47/16 211/106 |
| 5,111,956 A | 5/1992 | Jow | |
| 5,287,800 A * | 2/1994 | Orednick | A47F 3/14 126/9 R |
| 5,584,545 A | 12/1996 | LaVaute | |
| 5,819,640 A * | 10/1998 | Cuomo | A47J 27/10 99/483 |
| 6,132,018 A * | 10/2000 | McGrath | A47F 3/007 248/398 |
| 8,308,249 B2 | 11/2012 | Matus, Jr. | |
| 8,671,618 B2 | 3/2014 | Yingst | |
| 9,144,329 B1 | 9/2015 | McGrath | |
| 2005/0126858 A1 | 6/2005 | Yingst | |
| 2006/0230948 A1 * | 10/2006 | Matus, Jr. | A47J 36/12 99/426 |
| 2011/0193453 A1 | 8/2011 | Matus, Jr. | |

FOREIGN PATENT DOCUMENTS

KR 20160003439 A 1/2016

* cited by examiner

*Primary Examiner* — Christopher Garft
(74) *Attorney, Agent, or Firm* — Lambert & Associates; Gary E. Lambert; David J. Connaughton, Jr.

(57) ABSTRACT

An enclosure for a chafer stand is provided. The enclosure is configured to cover at least three sides of the chafer stand, protecting it from wind and cold air, and configured to keep food stored in the chafer stand warm. Further, a sneeze guard extends from a rear or side of the enclosure which extends above and over at least a portion of the chafer stand, allowing a user to access the food stored within the chafer stand from the front, and protecting it from above from breath, coughing, sneezing, and the like.

8 Claims, 7 Drawing Sheets

US 10,058,199 B1

FOOD TRAY ENCLOSURE

BACKGROUND OF THE INVENTION

Field of the Invention

The present invention relates generally to a chafer stand enclosure. More particularly, the present invention relates to a enclosure for a chafer stand, especially a wire framed chafer stand, which also provides a sneeze guard to protect food from above.

Description of Related Art

When arranging catered or buffet-style service, chafer stands are used to hold trays of food and fuel for keeping the food warm. Often, these stands are expensive, cumbersome, and can be too fancy or otherwise not appropriate for a particular event. An alternative chafer stand is seen in the disposable style wire chafer stands. This inexpensive alternative to conventional chafer stands features a wire design providing versatility in event usage, along with lower cost and increased portability. Wire style chafer stands are commonly used for weddings, receptions, parties, and other outdoor catered events where traditional chafer stands are too expensive or not desired.

However, a common shortcoming for these wire style chafer stands is that wind can pass through easily, and they provide little insulation, allowing the food to rapidly cool once in position.

Further, it is not uncommon at catered events using food trays for there to be contamination from above the trays caused by users when getting their food. Sneezing, coughing, breathing, and the like can cause contamination and spread infection. In the prior art, large and highly involved buffet stands may have sneeze guards to protect from these issues, but these sneeze guards are not available for individual chafer stands, especially at the more casual events which use the wire style chafer stands.

Therefore, what is needed is a device that may effectively enclose at least part of a chafer stand that may also provide a sneeze guard to protect from contamination.

SUMMARY OF THE INVENTION

The subject matter of this application may involve, in some cases, interrelated products, alternative solutions to a particular problem, and/or a plurality of different uses of a single system or article.

In one aspect, an enclosure for a chafer stand is provided. The enclosure is formed to cover an area of the chafer stand below where a tray that is held by the stand rests, thereby protecting it from heat loss. The enclosure has a first side wall, second side wall, and rear wall. A first widthwise edge of the rear wall connected to the first side wall, and a second widthwise edge of the rear wall connected to the second side wall. These walls are connected together in this embodiment, although that is not necessarily required. A sneeze guard extends upwardly from the rear wall to a height above a top of the walls, and then extends forward covering at least part of an area defined by the front of the side walls and rear wall.

In another aspect, a chafer stand assembly is provided. The assembly has a chafer stand which forms a tray holder. The tray holder is elevated above a surface on which the chafer stand is on. An enclosure is connected to the chafer stand. The enclosure has a first and second side wall and a rear wall. The first side wall is connected to a first side of the chafer stand with a top edge adjacent to the tray holder. The second side wall is connected to a second side of the chafer stand with a top edge adjacent to the tray holder. The rear wall is connected to a rear of the chafer stand, with a top edge adjacent to the tray holder. A sneeze guard extends upwardly from the rear wall to a height, and extends towards front edges of the first side wall and second side wall to cover the tray holder from above.

DETAILED DESCRIPTION

Figure 1:
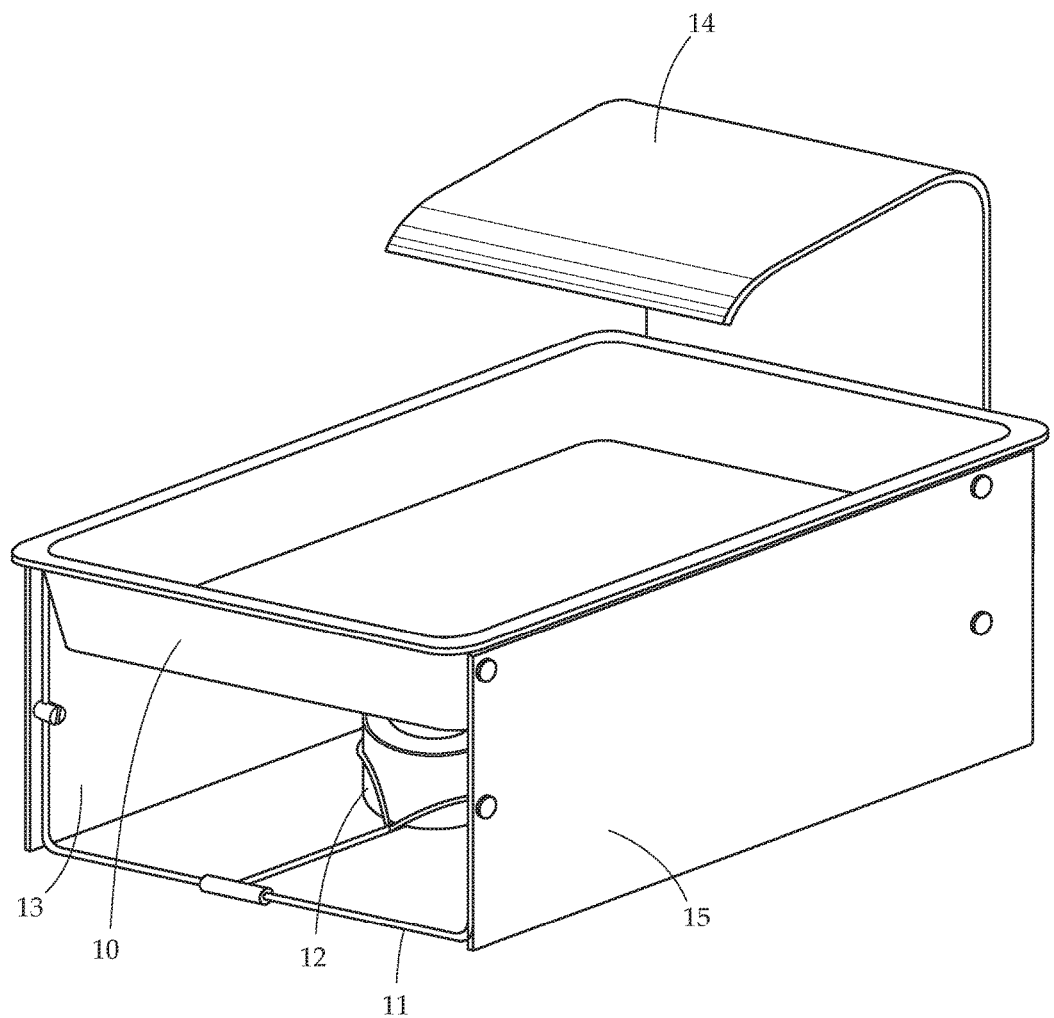
FIG. 1 provides a perspective view of an embodiment of the present invention.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention concerns an enclosure for a chafer stand. The enclosure has side walls and a rear wall configured to at least partially cover an open area of the stand between the surface on which it rests and a top of the stand. Typically, the wall height is high enough to reach a food tray that would be held by the chafer stand. A sneeze guard may extend upwardly from the rear wall to a height above the food tray that will be held in the chafer stand, and then extends forward to be positioned above and over where the food tray will be held. As configured, the sneeze guard may protect food against contamination from above. In many embodiments, the enclosure is configured to be connected to a wire-style chafer stand, but this is not necessarily required. Indeed, the enclosure of the present invention may also be used on numerous types of different chafer stands without straying from the scope of the present invention.

The enclosure may be connectable to the chafer stand in various ways, including, but not limited to snap connections, Velcro® or other hook and loop connection, magnetic connection, frictional connection, interlocking tabs, hooks, straps, and the like. In a particular embodiment, snap on clips may be specifically configured to clip onto the wire of the wire frame chafer stand. In such an embodiment, the clip or clips may be connected to the enclosure, and may have a body from which two arms extend. The arms are approximately parallel and close to, or in contact with, each other. The arms may define a wire-receiving region. The wire-receiving region may be any shape or configuration to hold a wire, such as a recession or detent along one or both arms. In one embodiment, the wire receiving region may be a recession in both arms at approximately the same height and direction on each arm. Given this configuration, the arms may be urged apart when pushed against a wire, and then once the wire-receiving region is reached, the wire can fit therein and the arms may return to, or close to, a resting position. The same operation may be reversed to release the clip from the wire.

Typically, a front face of the chafing dish may be open and not covered by the enclosure. However, in some embodiments, an additional front wall may be provided. This front wall may be connected to the chafer stand and/or a side wall or walls. In a further embodiment, the enclosure, either with or without the front wall, may have a vent along at least one of the walls. The vent may allow exhaust and/or air intake for a burning chafer fuel, such as Sterno®, positioned in the chafer stand.

In one embodiment, the sneeze guard may be formed at least partially of a transparent or translucent material, such that a user can see through the sneeze guard to the food below. Examples of transparent or translucent materials may include, but are not limited to, glass, plastic, and the like. The sneeze guard may be connected to the enclosure in any manner, and in some embodiments may connect directly to the chafer stand. The sneeze guard, in one embodiment, may be hingedly connected to the rear wall, though any other connection type may also be achieved without straying from the scope of this invention.

The enclosure, including the first, second, and rear walls may be formed of any material capable of at least partially limiting air flow. Examples of such materials may include, but are not limited to: plastics, metals, wood, composite materials, fabric, and the like.

In one embodiment, the enclosure may be formed having the walls and sneeze guard integrally formed with each other as a single piece. In another embodiment, the enclosure elements may be connectable to each other using any known connection structure, such as a snap fit, hinged connection, molded connection, and the like. In yet another embodiment, the walls need not be connected to each other, and can instead by separately connected to the chafer stand.

Figure 6:
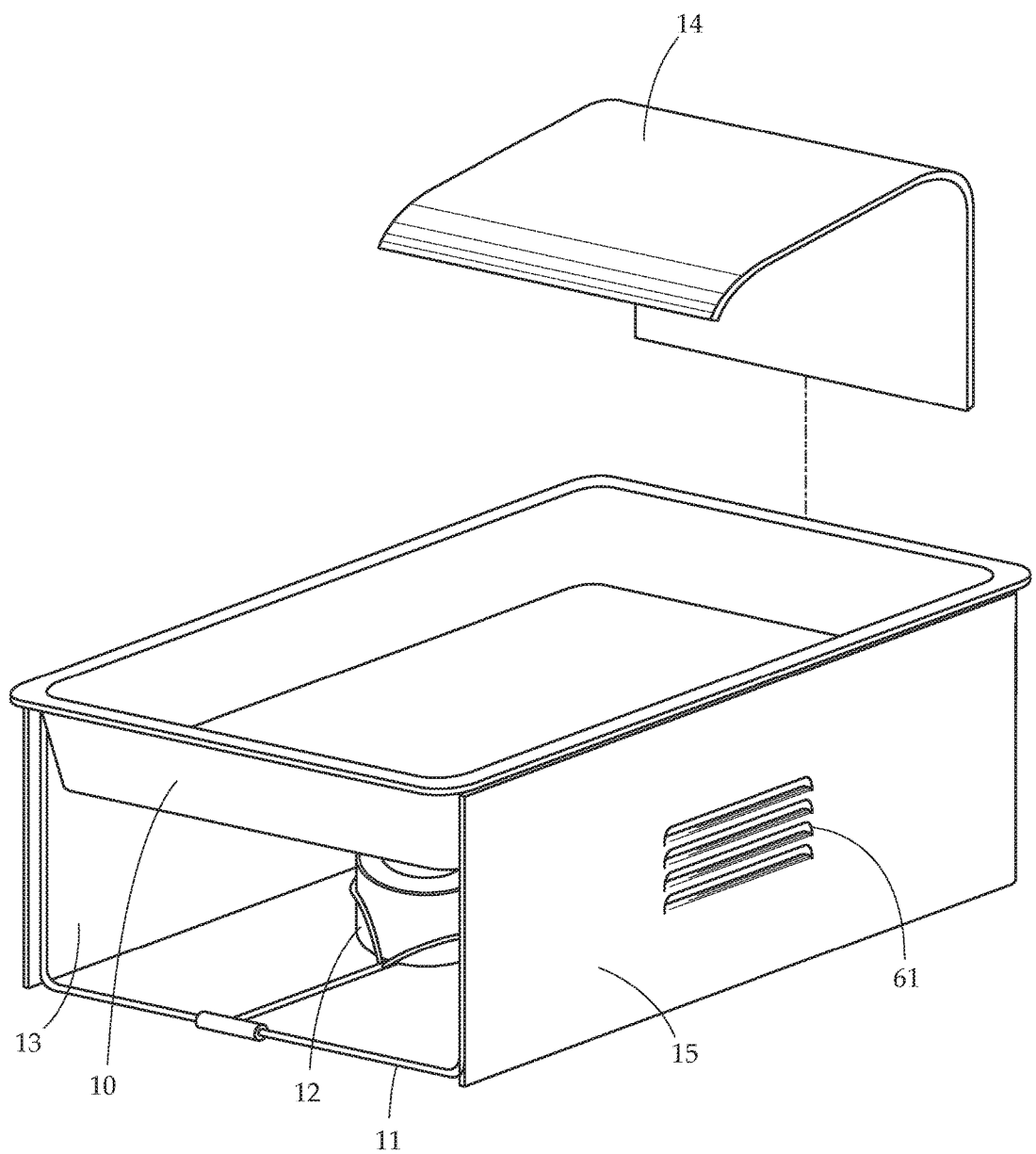
FIG. 6 provides a perspective view of another embodiment of the chafer stand enclosure.
Figure 7:
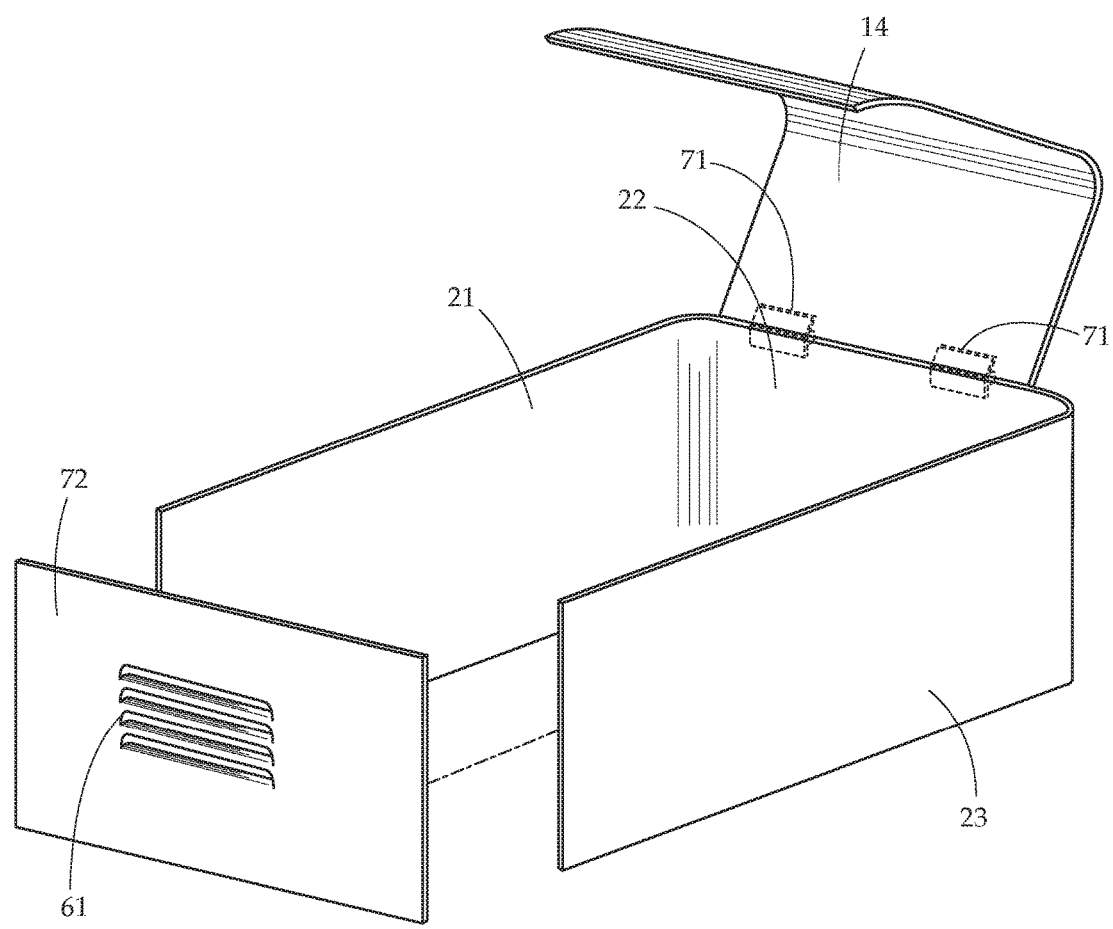
FIG. 7 provides a perspective view of yet another embodiment of the chafer stand enclosure.

Turning now to FIG. 1, a perspective view of an embodiment of the present invention connected to a chafer stand is shown. In this view, a food tray 10 is held by the chafer stand 11, which is shown here as a wire style chafer stand. A quantity of fuel 12 is held in a holder on the chafer stand 11 and can warm the food tray 10 when lit. A first and second side walls 13, 15 are on opposing lengthwise side ends of the chafer stand, configured to block wind and keep heat from escaping. A rear wall (not shown) is attached to the rear of the chafer stand 11 along a widthwise side of the chafer stand. As can be seen, a height of the side walls 13, 15, and rear wall (not shown) is sufficient to reach to an area adjacent to the tray held in the tray holder of the chafer stand 11 and also reach to or close to the surface on which the chafer stand is resting. The side walls 13, 15, define an open front at their distal ends. The open front has a cross sectional area greater than a cross sectional area of the front end of the chafer stand 11, allowing the enclosure to be slid into position about the chafer stand. Extending from the rear wall of the chafer stand enclosure is a sneeze guard 14 which extends approximately halfway along the length of the tray 10. In other embodiments, the sneeze guard 14 can extend more or less along the length of the tray 10, up to fully to the end of the tray 10. In a further embodiment, the sneeze guard may connect at both widthwise ends, so that it extends along the entire length of the tray 10 and is supported on both widthwise ends. As shown, the sneeze guard 14 extends upwardly to a height away from the food tray 10, then extends forward over the food tray 10, protecting it from above while allowing a user's hands to access the food for service. In a similar embodiment, shown in FIG. 6, the sneeze guard 14 may be removable from the rear wall. Further, a side wall 15 may define a vent 61 to allow some limited air flow. In another similar embodiment, shown in FIG. 7, the sneeze guard 14 may be hingedly connected to the rear wall 22 via hinge 71. Further, an optional front panel 72 is shown, which may serve to enclose a front opening defined by the side walls 23, 21.

Figure 2:
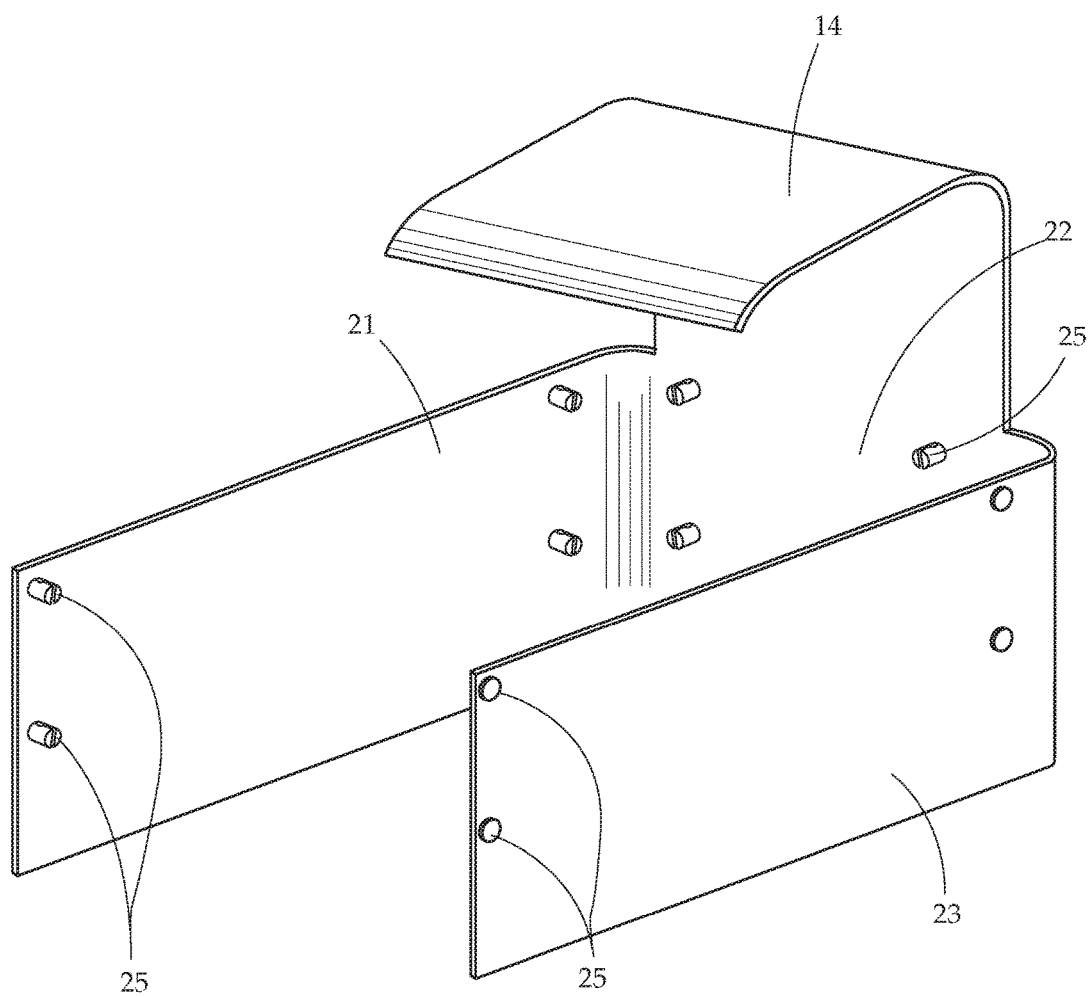
FIG. 2 provides a perspective view of another embodiment of the present invention.

FIG. 2 shows another embodiment of the enclosure of the present invention. In this view, first and second lengthwise side walls 21, 23, connect to the rear wall 22. The sneeze guard 14 extends upwardly to a height away from the walls 21-23, then extends forward over the food tray 10, protecting it from above while allowing a user's hands to access the food for service. A plurality of clips 25, configured in this embodiment as wire frame clips, are connected to each of the first, second, and rear walls 21-23. As shown in detail in FIG. 3, the clips may be configured to directly connect and receive the wire framed chafer stand.

Figure 3:
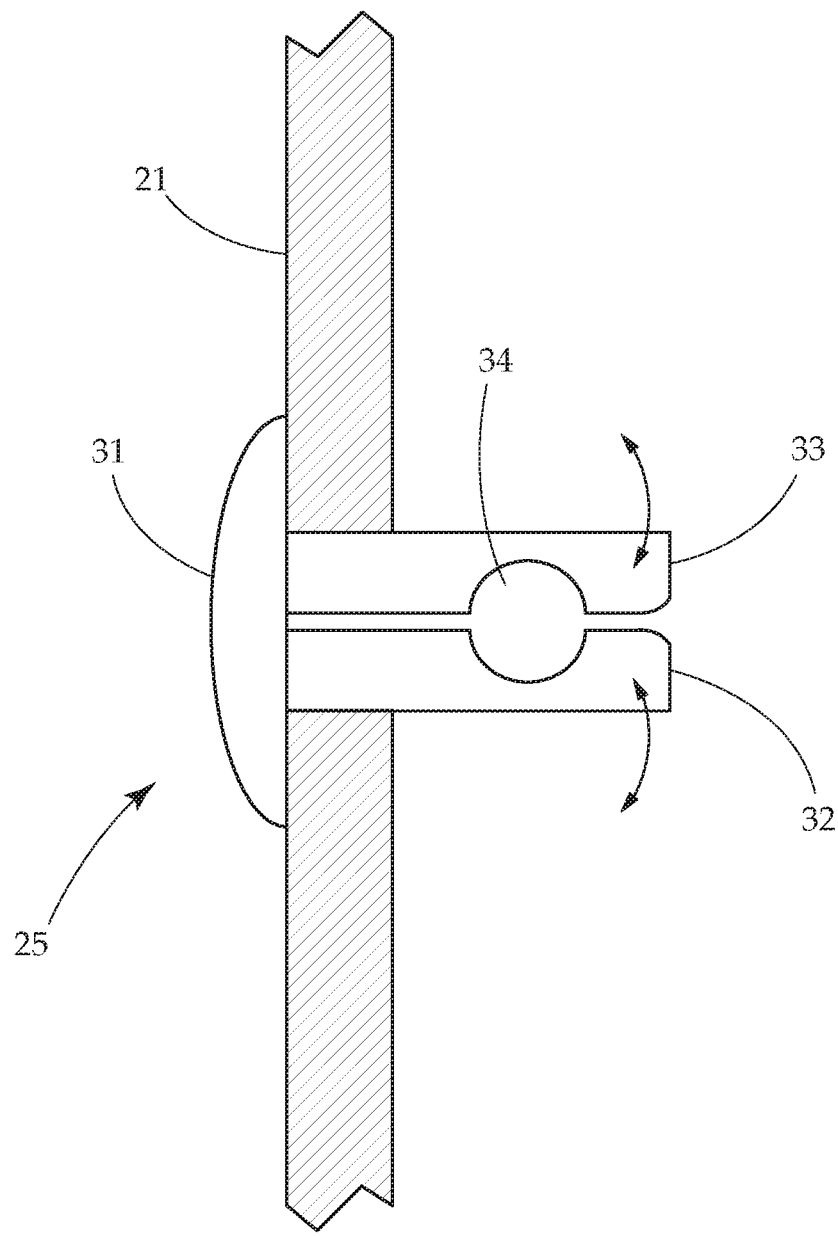
FIG. 3 provides a view of an embodiment of a clip of the present invention.

FIG. 3 shows an embodiment of a clip of the present invention. In this embodiment, clip 25 fits through an aperture defined by side wall 21 (or any other wall or surface of the enclosure). As shown in FIG. 2, one wall may have a plurality of clips passing through a plurality of apertures formed in the wall. The clip 25 has a top body 31 and arms 32, 33, which extend from the body 31. The arms 32, 33 define a wire-receiving region 34. Arms 32, 33 can move as shown by arrows, between an open position allowing wire to pass between them, and a closed position at a resting position as shown. The wire-receiving region 34 may be any shape capable of receiving a wire of the wire-framed chafer stand. Given this configuration, the arms 32, 33 may be urged apart towards an open position when pushed against a wire, and then once the wire reaches the wire-receiving region 34, the wire can fit therein and the arms 32, 33 may return to, or nearly to, a resting closed position. The same operation may be reversed to release the clip from the wire.

Figure 4:
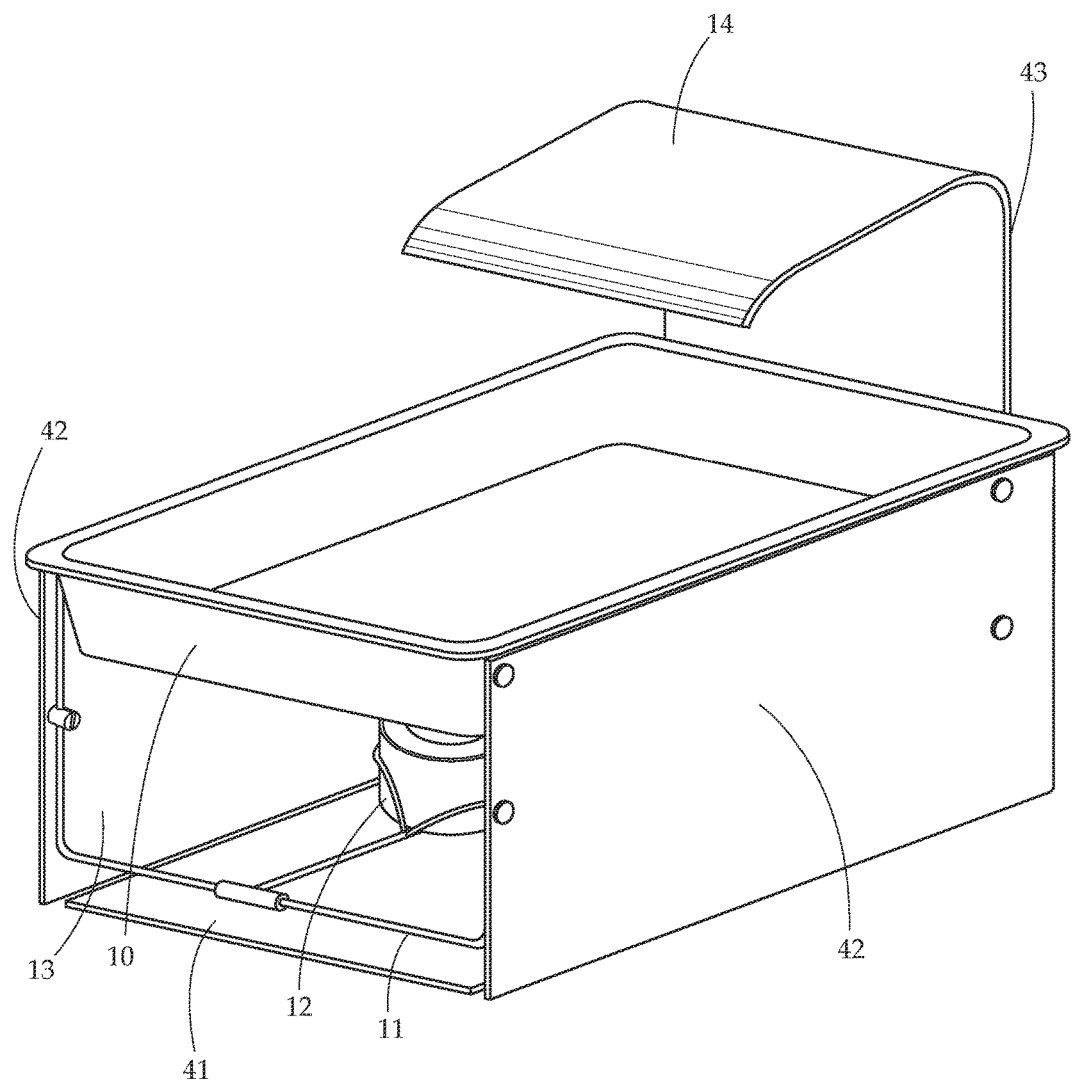
FIG. 4 provides a perspective view of yet another embodiment of the present invention having a base plate.
Figure 5:
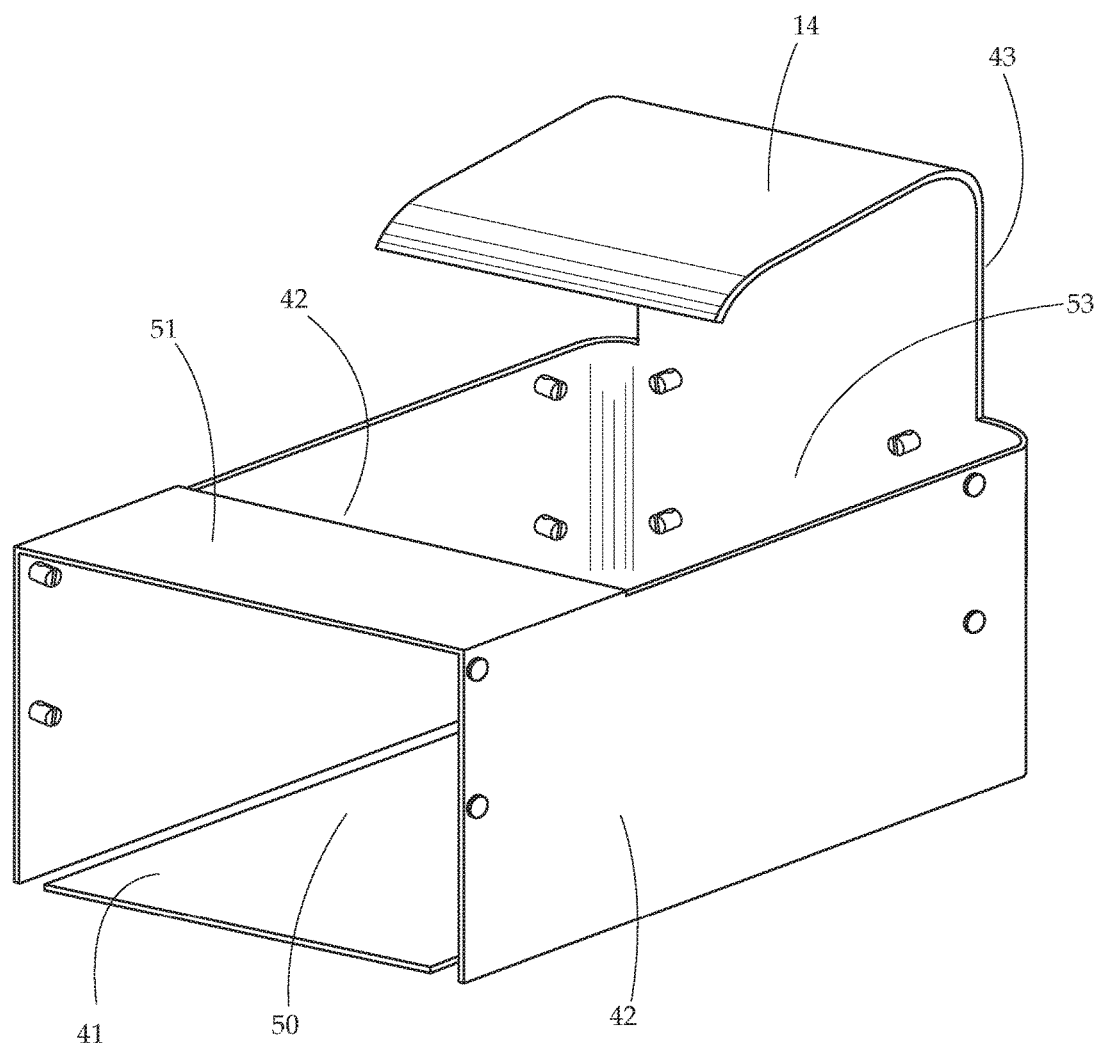
FIG. 5 provides a perspective view of still another embodiment of the present invention.

FIGS. 4 and 5 provide views of an embodiment of the device having an additional base panel 41. In this view, a food tray 10 is held by the chafer stand 11, which is shown here as a wire style chafer stand. A quantity of fuel 12 is held in a holder on the chafer stand 11 and can warm the food tray 10 when lit. A first and second side walls 42 are positioned adjacent to opposing lengthwise side ends of the chafer stand, configured to block wind and keep heat from escaping, and allowing a server to re-fill and monitor the tray from a first lengthwise side, while a customer or client may access the food from the opposite lengthwise side (as is the case for other embodiments as well). A rear wall 53 is positioned adjacent to the rear of the chafer stand 11. As can be seen, a height of the side walls 42, and rear wall 53 has a height that is sufficient to reach to an area adjacent to the tray held in the tray holder of the chafer stand 11. Extending from the rear wall of the chafer stand enclosure is a sneeze guard 14 from a side support 43. The sneeze guard 14 extends approximately halfway along the length of the tray 10. In other embodiments, the sneeze guard 14 can extend more or less along the length of the tray 10, up to fully to the end of the tray 10. In a further embodiment (not shown), the sneeze guard may connect at both widthwise ends, so that it extends along the entire length of the tray 10 and is supported on both widthwise ends. As shown, the sneeze guard 14 extends upwardly to a height away from the food tray 10, then extends forward over the food tray 10, protecting it from above while allowing a user's hands to access the food for service.

The base panel 41 is separated from side walls 42 allowing the structure to be slid in place over an existing tray 10 held on a wire frame 11. In FIG. 5, a top panel 51 extends between the side walls 42 to both reinforce the side walls 42 and also to provide a partial covering of the tray. It is important to note that in the embodiments of FIGS. 4 and 5, the connectors are not necessary, and in many embodiments the structure will not be physically connected to the tray and chafer stand, but instead are slid in place around the tray and chafer stand. In other embodiments however, the structure may indeed be physically connected to the chafer stand.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A chafer stand assembly comprising:
   a chafer stand having a tray holder, the tray holder elevated above a surface on which the chafer stand is on;
   an enclosure comprising:
      a first side wall adjacent to a first side of the chafer stand, the first side wall having a top edge adjacent to the tray holder;
      a second side wall adjacent to a second side of the chafer stand, the second side wall having a top edge adjacent to the tray holder;
      a rear wall adjacent to a rear of the chafer stand, the rear wall having a top edge adjacent to the tray holder;
      wherein a distal end of the first side wall and second side wall define an open front, the open front having a cross sectional area greater than a cross sectional area of a front end of the chafer stand, the open front allowing the enclosure to be slid over the chafer stand; and
      a sneeze guard extending upwardly from the rear wall to a height, and extending towards front edges of the first side wall and second side wall to cover the tray holder from above, and is spaced apart from the tray holder to allow access to the tray holder.

2. The enclosure for a chafer stand of claim 1 wherein the first side wall, second side wall, and rear wall are formed of a plastic material.

3. The enclosure for a chafer stand of claim 1 wherein a top of the first side wall and second side wall are sized to have a height equal to a distance from the tray holder to a bottom of the chafer stand.

4. The assembly of claim 1 wherein the sneeze guard is removably connected to the rear wall.

5. The assembly of claim 1 wherein the sneeze guard is hingedly connected to the rear wall.

6. The assembly of claim 1 further comprising a front wall connected to a front of the chafer stand.

7. The assembly of claim 1 wherein at least one of the first wall, second wall, and rear wall comprises a vent.

8. The chafer stand assembly of claim 1 wherein the open front is opposite to the rear wall.

* * * * *